United States Patent

[11] 3,607,033

| [72] | Inventor | Indravadan S. Shah<br>Forest Hills, N.Y. |
|---|---|---|
| [21] | Appl. No. | 794,169 |
| [22] | Filed | Jan. 27, 1969 |
| [45] | Patented | Sept. 21, 1971 |
| [73] | Assignee | Chemical Construction Corporation<br>New York, N.Y. |

[54] RECOVERY OF SULFUR DIOXIDE FROM WASTE GAS STREAMS
11 Claims, 1 Drawing Fig.

[52] U.S. Cl. .................................................. 23/167,
23/2, 23/178, 23/224
[51] Int. Cl. ...................................................... C01b 17/56,
C01b 17/72
[50] Field of Search .......................................... 23/2, 129,
130, 131, 177, 178, 201, 224, 167

[56] References Cited
UNITED STATES PATENTS

| 1,168,046 | 1/1916 | Basset ........................... | 23/178 |
| 1,747,047 | 2/1930 | Bradley et al. ................. | 23/131 |
| 1,969,769 | 8/1934 | Sweet et al. ................... | 23/201 X |
| 2,161,056 | 6/1939 | Johnstone et al. ............. | 23/178 S |
| 2,233,841 | 10/1938 | Lepsoe ........................... | 23/178 |
| 2,922,735 | 1/1960 | Johnstone ....................... | 23/178 X |
| 3,438,733 | 4/1969 | Grantham et al. .............. | 23/224 |
| 3,477,815 | 11/1969 | Miller et al. .................... | 23/178 |

*Primary Examiner*—Oscar R. Vertiz
*Attorney*—J. L. Chaboty

ABSTRACT: Sulfur dioxide is scrubbed from a waste gas stream using an aqueous sodium sulfite solution. The resulting solution containing sodium bisulfite and residual sodium sulfite is divided into two portions. Sodium carbonate is added to the first solution portion to convert sodium bisulfite to sodium sulfite, and the resulting solution is recycled for further gas scrubbing. The second portion is reacted with a solid carbonate reactant such as dolomite, magnesite or limestone, to form sodium carbonate in solution and precipitate solid crystals containing magnesium sulfite and/or calcium sulfite. The sodium carbonate is added to the first solution portion for the conversion of bisulfite to sulfite. The solid crystals are processed at elevated temperature to produce a sulfur-containing product and a mixture of solid magnesium oxide and calcium oxide, or either pure magnesium oxide or calcium oxide, depending on the solid reactant selected in the prior processing.

PATENTED SEP 21 1971 3,607,033
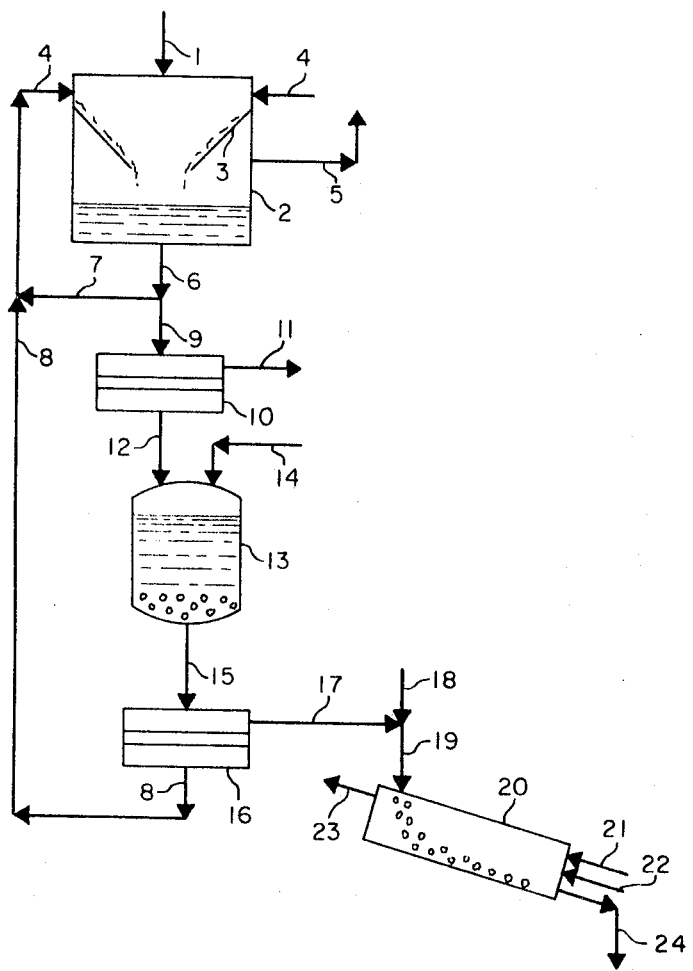
INDRAVADAN S. SHAH
INVENTOR.
BY J. T. Chaboty,
AGENT

RECOVERY OF SULFUR DIOXIDE FROM WASTE GAS STREAMS

BACKGROUND OF THE INVENTION

1. Field of the Invention

The invention relates to the removal of a sulfur dioxide contaminant from a waste gas stream, such as a flue gas derived from the combustion of a sulfur-containing carbonaceous or hydrocarbon fuel, or the tail gas from a sulfuric acid production process, before the waste gas stream is released to the atmosphere, so as to prevent air pollution and recover the sulfur dioxide in the form of a valuable sulfur-containing product. Thus, the invention is particularly applicable to the removal of sulfur dioxide from the waste gases of power plants, steam generators, space heating boilers and chemical plants such as sulfuric acid production facilities and organic sulfonation processes.

2. Description of the Prior Art

Numerous procedures and systems have been proposed or developed for the removal of sulfur oxides and principally sulfur dioxide, from a waste gas stream such as flue gas, and for the recovery of the sulfur dioxide in a usable form as a commercial product. Many prior art procedures employ alkaline solutions for this purpose. U.S. Pat. No. 2,849,292 is typical of prior art procedures, and U.S. Pat. Nos. 2,,919,976 and 2,106,952 are also pertinent. The U.S. Pats. Nos. 2,838,374 and 2,344,104 deal with the reduction of sulfites and sulfates, while U.S. Pat. applications Nos. 690,936 filed Dec. 15, 1967 and now allowed, and 693,230 filed Dec. 26,1967 relate to the use of aqueous alkali solutions for sulfur dioxide removal and subsequent processing of the resulting alkali sulfite to form useful products.

SUMMARY OF THE INVENTION

In the present invention, the waste gases containing sulfur dioxide enter an absorption or scrubbing system, where the gas stream is scrubbed and sulfur dioxide is absorbed by an aqueous solution containing dissolved sodium sulfite. Reaction takes place between sulfur dioxide and some of the sodium sulfite in aqueous solution, to form sodium bisulfite in aqueous solution. A portion of the resulting sodium sulfite-bisulfite solution is reacted with recycle sodium carbonate to convert bisulfite to sulfite, and this solution portion is then recycled for further waste gas scrubbing.

The bleed stream from the scrubbing system, consisting of the balance of the spent aqueous sodium sulfite-bisulfite scrubbing solution, is passed to a reactor, in which the bleed stream is reacted with a solid carbonate reactant such as dolomite, magnesite or limestone, to precipitate solid crystals containing magnesium sulfite and/or calcium sulfite, and form sodium carbonate in solution. The solid crystals are separated from the solution containing sodium carbonate, which is recycled for combination with the recycle scrubbing solution portion as described supra.

The solid crystals are processed at elevated temperature to produce a valuable sulfur-containing product and solid particles of magnesium oxide and/or calcium oxide. The processing of the solid crystals may consist of mixing the solid crystals with a solid carbonaceous material followed by heating, to produce an off-gas containing sulfur vapor, which is cooled to condense liquid or solid sulfur, or scrubbed with a suitable sulfur solvent to recover sulfur in solution. In an alternative embodiment of the invention, the solid crystals are calcined at an elevated temperature in the range of 400° C. to 1200° C., to produce solid particles containing magnesium oxide and/or calcium oxide, together with an off-gas rich in sulfur dioxide, which may be processed to produce liquid sulfur dioxide by cooling, or the off-gas may be passed to a sulfuric acid production facility for conversion to sulfuric acid. In other cases, carbon monoxide or other reducing agent may be reacted with the off-gas stream, to produce elemental sulfur vapor for recovery as product elemental sulfur.

The principal advantage of the process of the present invention is that sulfur dioxide is efficiently and substantially completely removed from a waste gas stream, so that the treated waste gas may be safely discharged to atmosphere without causing air pollution. Another advantage is that expensive materials or chemicals are not required for the process, since the only external component required is dolomite, dolomitic limestone, magnesite or limestone, which are relatively cheap minerals. A further advantage is that the sulfur dioxide is recovered and converted to a valuable sulfur-containing product such as elemental sulfur or sulfuric acid, which may be marketed to at least partially defray the expenses of the process.

It is an object of the present invention to provide an improved process for the removal of sulfur dioxide from waste gas streams such as flue gas.

Another object is to utilize an improved absorbent solution for scrubbing sulfur dioxide from waste gas streams.

A further object is to remove and recover sulfur dioxide from waste gas streams in the form of a valuable sulfur-containing product.

An additional object is to efficiently and substantially completely remove sulfur dioxide from waste gas streams.

Still a further object is to remove sulfur dioxide from waste gases by reaction with sodium sulfite in aqueous solution, thereby forming sodium bisulfite which is readily converted back to sodium sulfite by reaction with sodium carbonate.

Still another object is to provide a process for converting dolomite or other mineral carbonates into a more valuable solid product containing magnesium oxide and/or calcium oxide in an efficient manner.

An object is to recover sulfur dioxide present in small proportions in a waste gas stream, in the form of a concentrated gas stream rich in sulfur dioxide.

These and other objects and advantages of the present invention will become evident from the description which follows.

DESCRIPTION OF THE DRAWING AND PREFERRED EMBODIMENTS

Referring now to the drawing, a flowsheet of a preferred embodiment of the invention is presented. The waste gas stream 1 containing sulfur dioxide and entrained fly ash is derived from a waste or flue gas source such as a steam power plant or the like, or one of the other process sources mentioned supra. Stream 1 will typically contain in the range of about 0.01 percent to 1 percent sulfur dioxide content, together with entrained fly ash and soot, balance carbon dioxide and nitrogen, and stream 1 will typically be derived at an elevated temperature generally in the range of 100° C. to 300° C. Stream 1 is passed into the upper end of waste gas scrubber 2, which may be any suitable device for gas-liquid contact and gas scrubbing for sulfur dioxide removal. In this embodiment of the invention, unit 2 accomplishes waste gas scrubbing and sulfur dioxide absorption by the provision of an internal inverted frustoconical baffle 3, so that a venturi-type scrubbing action is attained. Aqueous scrubbing solution stream 4 containing dissolved sodium sulfite, and also containing a minor proportion of residual unconverted dissolved sodium bisulfite in most cases, is passed into unit 2 above and adjacent to the upper end of baffle 3, and flows downwards on the upper surface of baffle 3 for projection into the highly accelerated high-velocity waste gas stream at the lower central opening in baffle 3. The aqueous scrubbing liquor is thus projected and finely dispersed into the waste gas stream within unit 2 at a temperature typically in the range of 50° C. to 90° C., and sulfur dioxide absorption together with fly ash entrainment into the liquid phase take place in the lower part of unit 2. The scrubbed and cooled waste gas stream 5, now at a temperature typically in the range of 50° C. to 90° C. is discharged from unit 2 below baffle 3 and is passed to atmosphere or further utilization as desired. In most cases, stream 5 will be saturated with water vapor and will contain less than 0.01 percent sulfur dioxide content by volume.

The absorption of sulfur dioxide into the aqueous scrubbing liquor within unit 2 also results in the conversion of at least a portion of the dissolved sodium sulfite to sodium bisulfite. The resulting aqueous liquor stream 6 discharged from unit 2 now contains dissolved sodium bisulfite, residual sodium sulfite, and entrained fly ash. In instances when stream 1 contains a minor proportion of sulfur trioxide, such as when stream 1 is a flue gas derived from a steam power boiler or the like, stream 6 will also contain dissolved sodium sulfate. A portion of stream 6 is recycled for further waste gas scrubbing via stream 7, which is combined with recycle sodium carbonate solution stream 8, which may alternatively consist of a slurry or solids stream obtained by evaporation of water from the recycle stream as originally produced. The addition of stream 8 to stream 7 serves to convert sodium bisulfite in stream 7 to sodium sulfite by reaction with sodium carbonate. Combination of streams 7 and 8 thus results in the formation of aqueous scrubbing liquid stream 4, which is utilized as described supra.

The balance of stream 6 passes via stream 9 to solids filter or centrifuge 10, which is any suitable device for separating entrained solids from a liquid stream. The separated solid fly ash stream 11 removed from unit 10 is passed to waste disposal or other utilization. The filtered and solids-free liquid stream 12 discharged from unit 10 now principally contains dissolved sodium sulfite and sodium bisulfite, and may also contain dissolved sodium sulfate. The dissolved sodium salts in stream 12 are now converted to dissolved sodium carbonate and solid crystals containing magnesium sulfite, calcium sulfite and calcium sulfate by reaction of stream 12 with added particles of dolomite or dolomitic limestone within reactor unit 13. Dolomite in powdered solid form and consisting of solid particles containing magnesium carbonate and calcium carbonate is passed via stream 14 into unit 13, together with stream 12, and the resultant reaction of dolomite with the dissolved sodium salts component of stream 12 serves to form sodium carbonate in solution and precipitate solid crystals containing magnesium sulfite, calcium sulfite and calcium sulfate. As will appear infra, stream 14 may alternatively consist of magnesite or limestone. In instances when stream 12 does not contain sodium sulfate, such as when stream 1 is the tail gas from a sulfuric acid process and is devoid of sulfur trioxide, the precipitated solid crystals in unit 13 will principally consist of magnesium and calcium sulfites, together with residual powdered dolomite if present in excess. Suitable heating means, not shown, may also be provided in unit 13 in order to heat and concentrate the solution by evaporation of water vapor, which is then separately removed from unit 13.

The resulting slurry stream 15 discharged from unit 13 contains an aqueous solution phase consisting of sodium carbonate solution, together with solid salts usually in crystal form and principally containing magnesium sulfite and calcium sulfite. In instances when stream 14 is magnesite, the solid salts will essentially consist solely of magnesium sulfite, and when stream 14 is limestone, the solid salts in stream 15 will consist solely of calcium sulfite. Slurry stream 15 is passed through filter or centrifuge unit 16, and the resulting clear aqueous sodium carbonate solution phase discharged from unit 16 via stream 8 is combined and reacted with stream 7 to form stream 4, as described supra. Additional makeup sodium carbonate may also be added to stream 8 from external sources, and in some cases stream 8 will be concentrated in evaporation means not shown, to form a slurry or solid crystals, prior to addition to stream 7.

The solid sulfite salts stream 17, which may also contain sulfates and is also discharged from unit 16, is now preferably combined with solid carbon stream 18, which may consist of pulverized coal or coke. The combined solids stream 19 is passed into rotary kiln or calciner 20, which may be externally heated or preferably internally heated to a temperature typically in the range of 400° C. to 1200° C. by the combustion of fluid hydrocarbon fuel stream 21 with combustion airstream 22. The resulting off-gas stream 23 discharged from unit 20 contains elemental sulfur vapor, which is recovered from stream 23 as a product of the process by cooling stream 23 to selectively condense liquid sulfur, or by scrubbing stream 23 with a suitable sulfur solvent or by other suitable means. The processing in unit 20 thus liberates elemental sulfur vapor from the solid magnesium and calcium salts stream 17, which are converted to solid magnesium oxide and calcium oxide, with the resultant product solid oxides being discharged from unit 20 via stream 24. The product stream 24 may be utilized as a source of pure magnesium oxide and calcium oxide for the manufacture of various products, or stream 24 may be hydrated with water to produce a hydroxides mixture for various usages.

Numerous alternatives within the scope of the present invention will occur to those skilled in the art. Other types of gas-liquid contact apparatus or devices may be employed for the gas scrubbing function of unit 2, instead of a venturi contactor. Thus, unit 2 may in practice consist of a spray tower, packed tower or the like. In some instances, such as when stream 1 is heavily laden with entrained solid particles, stream 6 instead of stream 9 may be filtered to remove entrained solid particles, by passing stream 6 through a suitable filter or centrifuge similar to unit 10. A suitable stirrer or agitation device may be provided in unit 13, which may in practice consist of any suitable liquid-solids mixer. Unit 16 may consist of any suitable filter or centrifuge, and the solids stream 17 discharged from unit 16 may be dried by contact with a hot drying gas such as heated air or the like, prior to passing into unit 20. In one alternative embodiment of the invention stream 18 may be omitted, in which case stream 23 would consist of a gas stream rich in sulfur dioxide, which may be recovered as liquid sulfur dioxide by compressing and cooling stream 23, or stream 23 may be passed to a sulfuric acid production facility for conversion to sulfuric acid, or in a further alternative when stream 23 is rich in sulfur dioxide, stream 23 may be reacted with a suitable reducing medium such as gaseous carbon monoxide, to form elemental sulfur vapor in the gas stream which may be recovered as described supra. Stream 17 may alternatively be oxidized to convert sulfites to sulfates, in which case solid magnesium sulfate and calcium sulfate would be products of the process. In instances when stream 14 is magnesite, or magnesium carbonate, stream 17 will essentially consist solely of magnesium sulfite, and stream 24 will consist of magnesium oxide. Alternatively, in instances when stream 14 is limestone, or calcium carbonate, then stream 17 will essentially consist solely of calcium sulfite, and stream 24 will consist of calcium oxide. It will be understood that the present invention encompasses the usage of these various mineral carbonates for feed stream 14.

An example of an industrial application of the process of the present invention will now be described.

EXAMPLE

The process of the present invention was applied to the removal of sulfur dioxide and fly ash from a flue gas stream produced by the combustion of coal in a steam power boiler. Following are the temperatures and component flow rates or concentrations for principal process streams.

| Stream No. | Temperature, C. | Component | Flow rate or concentration |
|---|---|---|---|
| 1 | 150 | Total flue gas | 3010 actual cu. meters/minute. |
| 1 | | Sulfur dioxide | 2,000 parts per million. |
| 1 | | Fly ash | 159 grains/standard cu. meter. |
| 5 | 58 | Total scrubbed gas. | 2,500 actual cu. meters/minute. |
| 5 | | Sulfur dioxide | 100 parts per million. |
| 5 | | Fly ash | 3.18 grains/standard cu. meter. |
| 4 | 58 | Total stream | 13,250 liters/minute. |
| 11 | | Fly ash | 211 kilograms/minute. |
| 11 | | Water | 20.4 kilograms/minute. |
| 14 | | Dolomite | 15.9 kilograms/minute. |
| 17 | | Calcium sulfite | 10.2 kilograms/minute. |
| 17 | | Magnesium sulfite | 8.85 kilograms/minute. |

| Stream No. | Temperature, C. | Component | Flow rate or concentration |
|---|---|---|---|
| 17 | | Water | 2.3 kilograms/minute. |
| 18 | | Carbon | 4.08 kilograms/minute. |
| 23 | 1,200 | Sulfur | 5.45 kilograms/minute. |
| 24 | 1,200 | Magnesium oxide | 3.4 kilograms/minute. |
| 24 | 1,200 | Calcium oxide | 4.75 kilograms/minute. |

I claim:

1. A process for the recovery of sulfur dioxide from a waste gas stream containing sulfur dioxide which comprises scrubbing said waste gas stream with an aqueous absorbent solution containing dissolved sodium sulfite, whereby sulfur dioxide is absorbed into said aqueous absorbent solution and reacts with a portion of the dissolved sodium sulfite to form sodium bisulfite, dividing the resulting solution into a first portion and a second portion, adding a reactant stream comprising sodium carbonate to said first solution portion, whereby sodium bisulfite in said first solution portion is converted to sodium sulfite, recycling the resulting first solution portion for further waste gas scrubbing, forming aqueous sodium carbonate solution by adding a mineral carbonate selected from the group consisting of dolomite, dolomitic limestone, magnesite and limestone in particulate form to said second solution portion, whereby said mineral carbonate reacts with dissolved sodium sulfite and sodium bisulfite in said second solution portion to form dissolved sodium carbonate and insoluble solid crystals containing a sulfite selected from the group consisting of magnesium sulfite, calcium sulfite and mixtures thereof, said solid crystals being precipitated from residual aqueous solution containing sodium carbonate, recycling sodium carbonate contained in said residual aqueous solution as said reactant stream comprising sodium carbonate, and processing said solid crystals at elevated temperature to produce a sulfur-containing product and a solid oxide selected from the group consisting of magnesium oxide, calcium oxide, and a mixture of solid magnesium oxide and calcium oxide.

2. The process of claim 1, in which said waste gas stream contains entrained solid particles, said solid particles are scrubbed from said waste gas stream by said aqueous absorbent solution, and said second solution portion is processed to remove the solid particles component prior to addition of said mineral carbonate particles.

3. The process of claim 1, in which said solid crystals are processed by adding a solid particulate carbonaceous material to said solid crystals, heating the resulting solids mixture under reducing conditions, whereby an off-gas stream containing elemental sulfur vapor is evolved, and cooling the off-gas stream to condense product elemental sulfur.

4. The process of claim 1, in which said solid crystals are processed by calcining said solid crystals at a temperature in the range of 400° C to 1200° C., whereby an off-gas stream containing sulfur dioxide is evolved, and cooling said off-gas stream to condense product liquid sulfur dioxide.

5. The process of claim 1, in which said solid crystals are processed by calcining said solid crystals at a temperature in the range of 400° C. to 1200° C., whereby an off-gas stream containing sulfur dioxide is evolved, and passing said off-gas stream to a sulfuric acid production facility, whereby the sulfur dioxide content of said off-gas stream is converted to sulfuric acid.

6. The process of claim 1, in which said waste gas stream contains sulfur trioxide, said sulfur trioxide is absorbed into said aqueous absorbent solution whereby sodium sulfate is formed in solution, the sodium sulfate content of said second solution portion is converted to a solid sulfate selected from the group consisting of magnesium sulfate and calcium sulfate and dissolved sodium carbonate by the addition of said mineral carbonate particles, whereby said solid crystals contain a solid sulfate, and the solid sulfate content of said solid crystals is also converted to a sulfur-containing product and an oxide selected from the group consisting of magnesium oxide and calcium oxide by the processing of said solid crystals at elevated temperature.

7. A process for the recovery of sulfur dioxide from a waste gas stream containing sulfur dioxide which comprises scrubbing said waste gas stream with an aqueous absorbent solution containing dissolved sodium sulfite, whereby sulfur dioxide is absorbed into said aqueous absorbent solution and reacts with a portion of the dissolved sodium sulfite to form sodium bisulfite, dividing the resulting solution into a first portion and a second portion, adding a reactant stream comprising sodium carbonate to said first solution portion, whereby sodium bisulfite in said first solution portion is converted to sodium sulfite, recycling the resulting first solution portion for further waste gas scrubbing, forming aqueous sodium carbonate solution by adding dolomite particles to said second solution portion, whereby said dolomite reacts with dissolved sodium sulfite and sodium bisulfite in said second solution portion to form dissolved sodium carbonate and insoluble solid crystals containing magnesium sulfite and calcium sulfite, said solid crystals being precipitated from residual aqueous solution containing sodium carbonate, recycling sodium carbonate contained in said residual aqueous solution as said reactant stream comprising sodium carbonate, calcining said solid crystals at a temperature in the range of 400° C. to 1200° C., whereby an off-gas stream containing sulfur dioxide is evolved and a mixture of solid magnesium oxide and calcium oxide is produced, and processing said off-gas stream to produce a sulfur containing product.

8. The process of claim 7, in which said waste gas stream contains entrained solid particles, said solid particles are scrubbed from said waste gas stream by said aqueous absorbent solution, and said second solution portion is processed to remove the solid particles component prior to addition of said dolomite particles.

9. The process of claim 7, in which said off-gas stream is processed to produce a sulfur-containing product by cooling said off-gas stream to selectively condense product liquid sulfur dioxide.

10. The process of claim 7, in which said off-gas stream is processed to produce a sulfur-containing product by passing said off-gas stream to a sulfuric acid production facility, whereby the sulfur dioxide content of said off-gas stream is converted to sulfuric acid.

11. The process of claim 7, in which said waste gas stream contains sulfur trioxide, said sulfur trioxide is absorbed into said aqueous absorbent solution whereby sodium sulfate is formed in solution, the sodium sulfate content of said second solution portion is converted to solid calcium sulfate and dissolved sodium carbonate by the addition of said dolomite particles, whereby said solid crystals contain calcium sulfate, and the calcium sulfate content of said solid crystals is also converted to gaseous sulfur dioxide and calcium oxide by the calcining of said solid crystals.